United States Patent [19]
Nakakura

[11] Patent Number: 5,572,714
[45] Date of Patent: Nov. 5, 1996

[54] INTEGRATED CIRCUIT FOR PIPELINE DATA PROCESSING

[75] Inventor: Yasuhiro Nakakura, Osaka, Japan

[73] Assignee: Matsushita Electric Industrial Co., Ltd., Osaka, Japan

[21] Appl. No.: 139,162

[22] Filed: Oct. 21, 1993

[30] Foreign Application Priority Data

Oct. 23, 1992 [JP] Japan ................................. 4-285713

[51] Int. Cl.⁶ ............................................ G06F 1/12
[52] U.S. Cl. ............................. 395/555; 364/DIG. 1; 364/271; 364/271.4; 364/271.5; 395/376
[58] Field of Search ........................ 395/550, 375

[56] References Cited

U.S. PATENT DOCUMENTS

| | | | |
|---|---|---|---|
| 4,639,886 | 1/1987 | Hashimoto et al. | 364/736 |
| 4,783,783 | 11/1988 | Nagai et al. | 371/12 |
| 4,887,233 | 12/1989 | Cash et al. | 364/757 |
| 4,916,659 | 4/1990 | Persoon et al. | 364/900 |
| 4,977,582 | 12/1990 | Nichols et al. | 375/118 |
| 5,142,685 | 8/1992 | Furui et al. | 395/800 |
| 5,148,536 | 9/1992 | Witek et al. | 395/425 |
| 5,212,782 | 5/1993 | Asato et al. | 395/500 |
| 5,371,880 | 12/1994 | Bhattacharya | 395/550 |

FOREIGN PATENT DOCUMENTS 4-169928  6/1992  Japan .

*Primary Examiner*—Kevin A. Kriess
*Assistant Examiner*—St. John Courtenay, III
*Attorney, Agent, or Firm*—McDermott, Will & Emery

[57] ABSTRACT

The present invention discloses an integrated circuit for use in pipeline processing formed by a plurality of stages. Data is latched by a first latch. A first logic element receives the output of the first latch and processes it. A second latch receives the output of the first logic element and processes it. A second logic element receives the output of the second latch and processes it. If the processing time of the first logic element is longer than that of the second logic element, a clock signal being applied to the second latch which gives its output to the second logic element is delayed by a delay element a given delay time. Such a given delay time is determined to be below the minimum delay time of the first logic element. Cycles per pipeline stage are variable. With a clock cycle shorter than the processing time of one of the first and second logic elements that has a longer processing time than the other, pipeline processing becomes possible. Therefore, data processing time shortens.

15 Claims, 10 Drawing Sheets

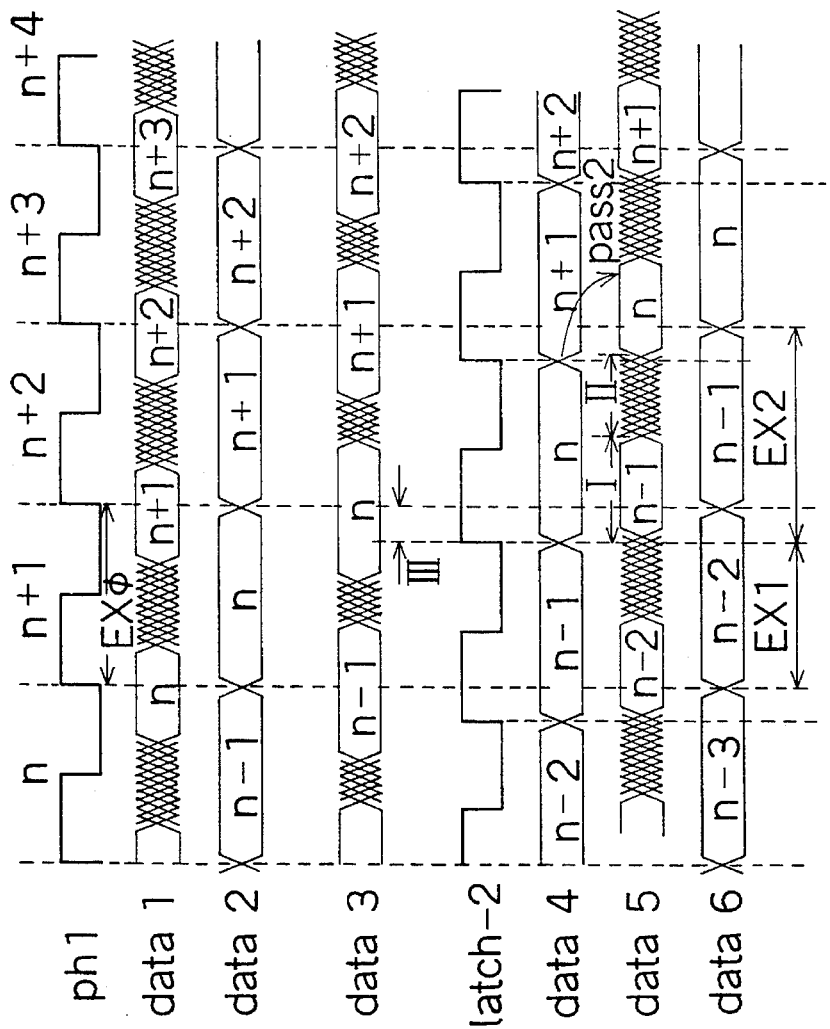
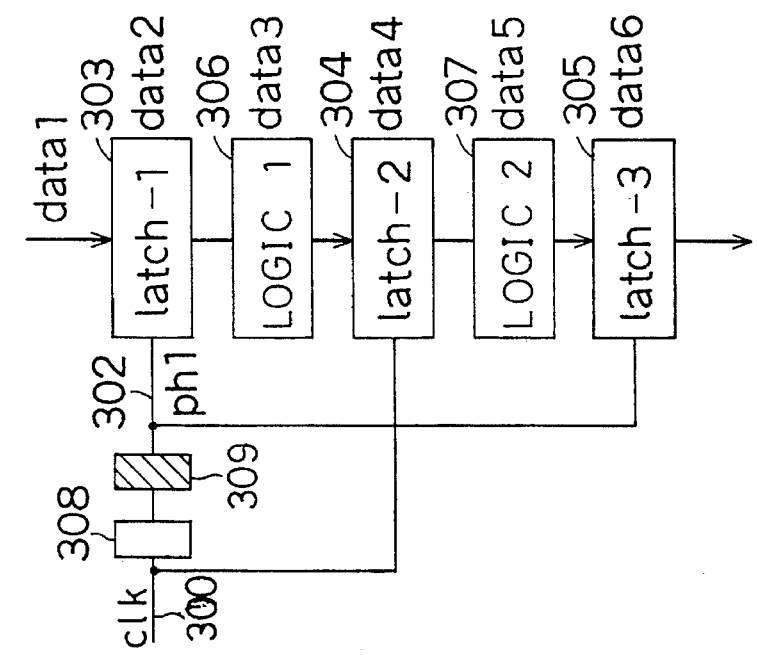

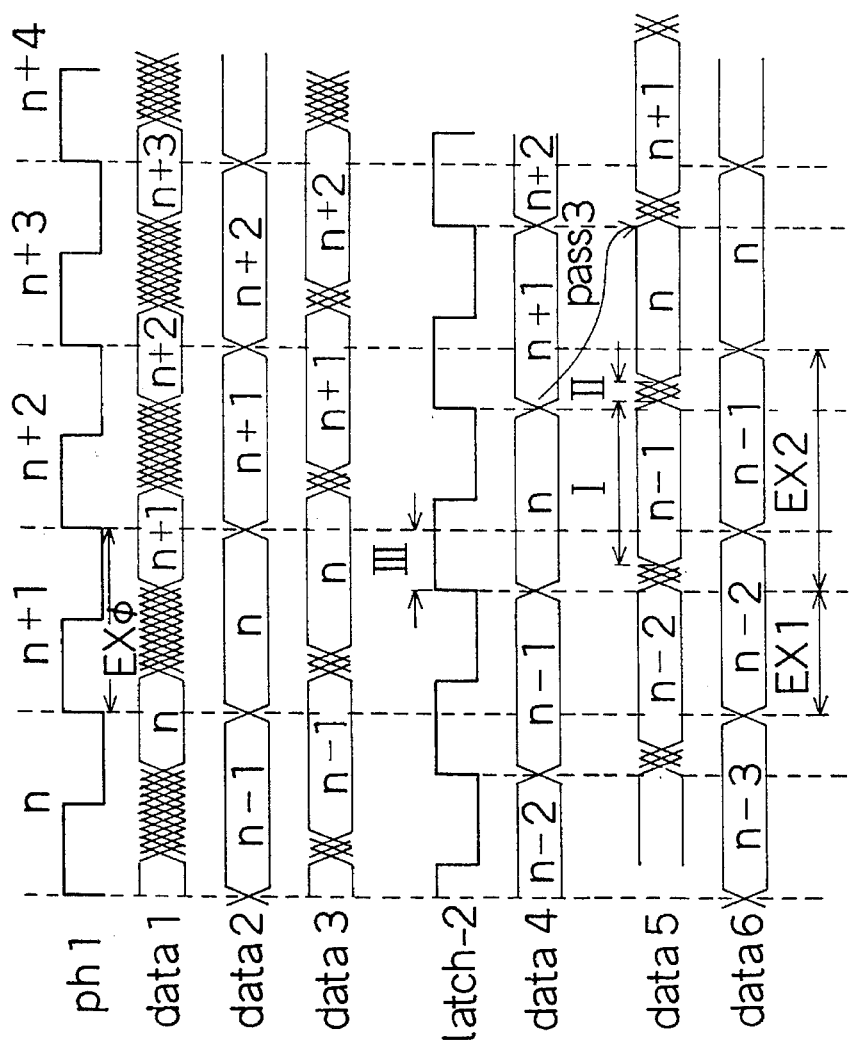
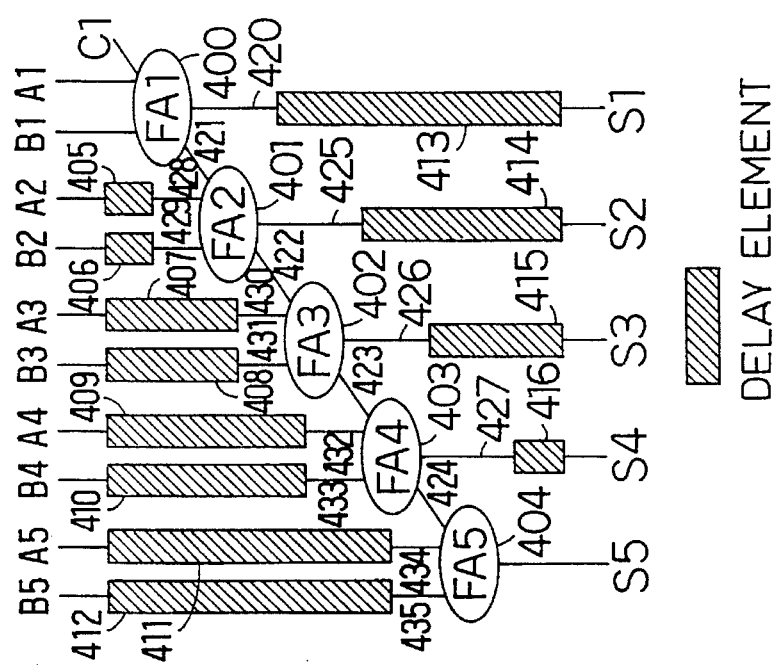
FIG. 9(a)
FIG. 9(b)

INTEGRATED CIRCUIT FOR PIPELINE DATA PROCESSING

FIELD OF THE INVENTION

This invention generally relates to improved integrated circuits (IC) and in particular to ICs for pipeline data processing at high speed.

BACKGROUND OF THE INVENTION

The integrated circuit industry is constantly trying to manufacture ICs applicable to high-speed pipeline data processing. The rate of instruction execution depends upon the speed of each of operational blocks in a computer. In order to increase the speed of operational blocks, there has been offered a technique known as pipeline data processing in the art. Pipeline data processing is a technique in which a data processor is broken into a plurality of processing stages for overlapping the execution of several instructions at the same time.

One such pipeline data processing is described by reference to FIGS. 10a and 10b. FIG. 10a shows the organization of a conventional IC for pipeline data processing. FIG. 10b is a data flow diagram in the conventional pipeline data processing. FIG. 11 depicts a logic element, used for the conventional pipeline data processing, by way of example.

FIG. 10a shows the following: a clock generator; latches (i.e. latch-1, latch-2, and latch-3); and logic elements 1 and 2. An external clock CLK is applied to the clock generator, and then the clock generator generates a clock signal ph1. The clock signal ph1 is delivered to the latch-1, to the latch-2, and to the latch-3 so that these three latches are timed for synchronization. In synchronism with the clock signal ph1, the latch-1 takes data (i.e. data1) and outputs data (i.e. data2). In synchronism with the clock signal ph1, the latch-2 takes data (i.e. data3) and outputs data (i.e. data4). In synchronism with the clock signal ph1, the latch-3 takes data (i.e. data5) and outputs data (i.e. data6). The logic element 1 receives data2, processes it, and outputs data3 as a result of such processing. The logic element 2 receives data4, processes it, and outputs data5 as a result of such processing.

FIG. 11 shows the organization of the logic element 1. The logic element 1 has full adders FA1, FA2, FA3, FA4, and FA5. A1 to A5, B1 to B5, and C1 are equivalent to data2. S1 to S5 are equivalent to data D3. The full adder FA1 receives C1, A1, and B1 and outputs S1 (i.e. a sum output) while delivering a carry output 221 to the next full adder FA2. The full adder FA2 receives A2 and B2, in addition to the carry output 221 and outputs S2 (i.e. a sum output) while delivering a carry output 222 to the next full adder FA3. The full adder FA3 receives A3 and B3, in addition to the carry output 222 and outputs S3 (i.e. a sum output) while delivering a carry output 223 to the next full adder FA4. The full adder FA4 receives A4 and B4, in addition to the carry output 223 and outputs S4 (i.e. a sum output) while delivering a carry output 224 to the next full adder FA5. The full adder FA5 receives A5 and B5, in addition to the carry output 224 and outputs S5 (i.e. a sum output).

In the case of the logic element 1 of FIG. 11, its maximum delay time is the time between the application of A1 and the appearance of S5 (i.e. the time taken for traversing a carry propagation path passing through all the full adders FA1 to FA5), while on the other hand its minimum delay time is the time between the variation of A1 and the appearance of S1 (i.e. the time taken for traversing a path passing through only one of the full adders FA1 to FA5).

The operation of the above-described prior art is explained by making reference to FIGS. 10a and 10b.

The flow of data is described by focusing on n-th data of data1. At (n+1)-th cycle, the n-th data is fed to the logic element 1 as data2. At the end of (n+1)-th cycle, the n-th data becomes definite. At (n+2)-th cycle, the n-th data is fed to the logic element 2, and at the end of (n+2)-th cycle, the logic element 2 outputs data which is defined as data5. Such defined data is output by the latch-3 at (n+3)-th cycle.

Without the execution of pipeline processing, the sum of the delay time of the logic element 1 and the delay time of the logic element 2 must fall within the range of one clock cycle. This inevitably increases the length of a clock cycle, resulting in the slow down of operation. Conversely, with the execution of pipeline processing, the following data becomes processable for every clock cycle. What is required is that each of the delay times of the logic elements 1 and 2 just falls within the range of one clock cycle. Because of this, high-speed data processing is achievable.

In FIG. 10b, an interval taken for defining the data output of the logic element 1 is indicated by I. An interval, within which the data output of the logic element 1 is not subjected to any definition, is indicated by II. The interval I has a sub-interval indicated by III which still remains definite even after (n+1)-th data is applied to an input of the logic element 1. In other words, the interval III is the minimum delay time of the logic element 1.

If pipeline processing is performed by the above-described configuration with the logic elements 1 and 2 having different maximum delay times, processing time (clock cycle) is restricted to a greater one of the maximum delay times of the logic elements 1 and 2. This impedes high-speed data processing.

Theoretically, the above problem could be dealt with by equalizing the maximum delay times of logic elements. This requires adequate recombination of the logic elements 1 and 2 so as to optimize them. Such optimization is a difficult problem. Further, if logic elements, which are not optimized, are used, it is necessary to take a number of elapsed data in order to obtain logic results during the logical processing. This requires large-scaled latches.

DISCLOSURE OF THE INVENTION

Bearing in mind the above problems, the present invention was made. It is a main object of the present invention to provide an improved IC capable of performing processing at each stage in pipeline processing in a clock cycle shorter than the processing time of a slower logic element for data processing at high speed.

The present invention employs a technique in which processing at a slower logic element (i.e. a logic element whose processing time is long) breaks into the clock cycle of processing at a faster logic element (i.e. a logic element whose processing time is short). To achieve this, a latch for delivering data to a first logic element and a latch for delivering data to a second logic element have differing data latch timing.

More specifically, the present invention discloses a first IC which has the following: a first latch for latching data in synchronism with an input clock signal; a first logic element for receiving the output of the first latch and processing it; a second latch for latching the output of the first logic element in synchronism with an input clock signal; a second logic element, having a processing time different from that of the first logic element, for receiving the output of the second latch and processing it; and a timing adjustment means for performing adjustment of input timing between a clock signal applied to the first latch and a clock signal applied to the second latch.

The present invention discloses a modification of the above-described IC wherein the timing adjustment means functions in such a way that a clock signal being applied to a latch which gives its output to a faster logic element is delayed an amount of time shorter than the minimum delay time of a slower logic element and that a clock signal being applied to another latch which gives its output to the slower logic element is not delayed.

Further, the present invention discloses an IC in which: a slower logic element is provided with a delay element by which an input signal or output signal passing through paths other than a path for a signal becoming the maximum delay; and the delay time of the delay element is determined in such a way as to reduce the difference between the minimum delay time of a signal passing thorough the delay element and the maximum delay time of the logic element.

In accordance with the present invention, at the time of the execution of multi-stage pipeline processing, the timing adjustment means performs adjustment of latch timing of the first and second latches, so that the latch timing of one latch that gives its output to a faster logic element is slow compared with the latch timing of the other latch that gives its output to a slower logic element. As a result, the slower logic element's processing breaks into the clock cycle of the faster logic element's processing and is continued. Therefore, the execution of each processing stage in the pipeline processing is made in a clock cycle shorter than one required for the processing at a slower logic element. The speed of data processing becomes increased as a whole.

Although, within one clock cycle of a slower logic element, a period of time during which data processed at one stage has not been latched at the next stage and a period of time for processing the following input data partially overlap, the amount of time for which a clock signal is delayed by the timing adjustment means is set in such a way that it is shorter than the minimum delay time of a slower logic element. Because of such arrangement, data, which is being output from the slower logic element, is latched at a later processing stage, before it disappears due to the processing operation of the next data. Accordingly, data jump to the next pipeline processing stage caused by the deviation of latch timing is avoidable.

Owing to the provision of a delay element in a slower logic element, the minimum delay time of the slower logic element lengthens, thereby making it possible for the timing adjustment means to delay by a proportional amount of time a clock signal. Accordingly, even if two logic elements have much different processing times, it is possible to execute each processing stage in pipeline processing in a clock cycle shorter than one required by a slower logic element by making processing at a slower logic element break into the clock cycle of processing at a faster logic element. Therefore, a shorter clock cycle becomes available. The speed of data processing increases. Since the minimum delay time of a signal passing through a delay element is set shorter than the maximum delay time of a logic element, the maximum delay time of the logic element does not become increased due to delay produced by the delay element.

BRIEF DESCRIPTION OF THE DRAWINGS

In the accompanying drawings of which:

FIG. 7a is a block diagram of an IC of a third example of the present invention;

FIG. 7b is a data flow diagram of an IC of the third example;

FIG. 9a is a block diagram of a logic element of an IC of a fourth example of the present invention:

FIG. 9b is a data flow diagram of an IC of the fourth example;

PREFERRED EMBODIMENTS OF THE INVENTION

Preferred embodiments are now described below.

EXAMPLE 1

Figure 1:
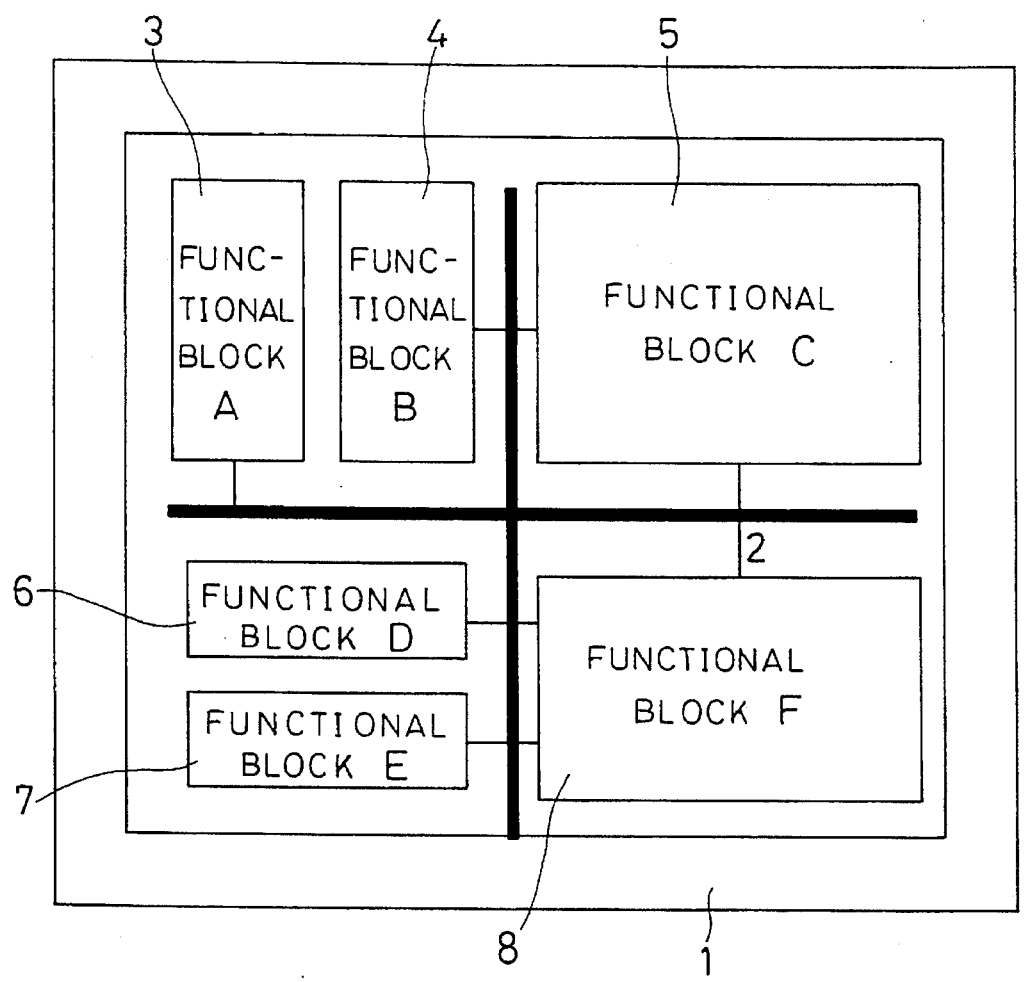
FIG. 1 is the layout off an IC in accordance with the present invention.

FIG. 1 shows a first IC of the invention. The first IC has the following: an external input/output pad 1; a clock line 2 for the transfer of clock signals from the external input/output pad 1; functional blocks A to F which receive from the clock line 2 clock signals so as to execute their respective given functions.

Figure 2:
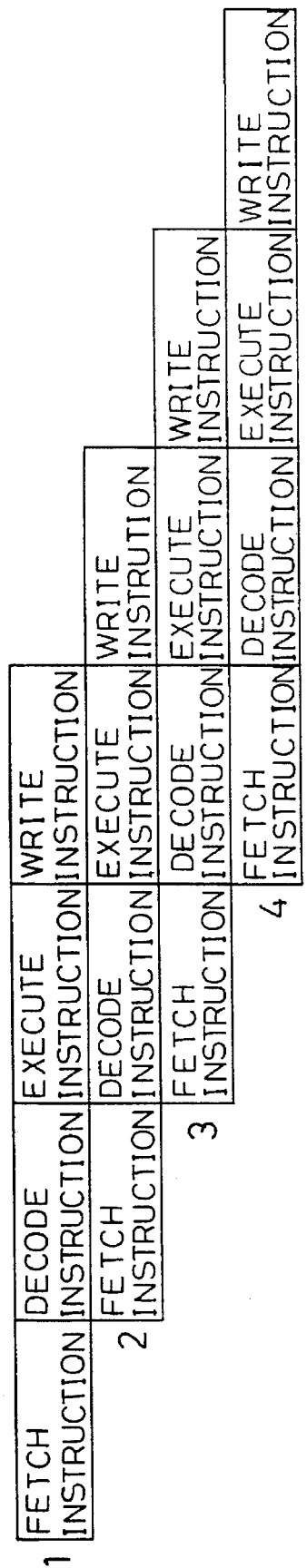
FIG. 2 is a diagram showing the sequence of steps in pipeline control.

Referring now to FIG. 2, the basic function of one of the functional blocks A to F (say the functional block C) is explained. FIG. 2 shows pipeline control by the functional block C for the overlapping of the execution of cycles of (1) FETCH INSTRUCTION, (2) DECODE INSTRUCTION, (3) EXECUTE INSTRUCTION, and (4) WRITE INSTRUCTION.

Figures 3A, 3B:
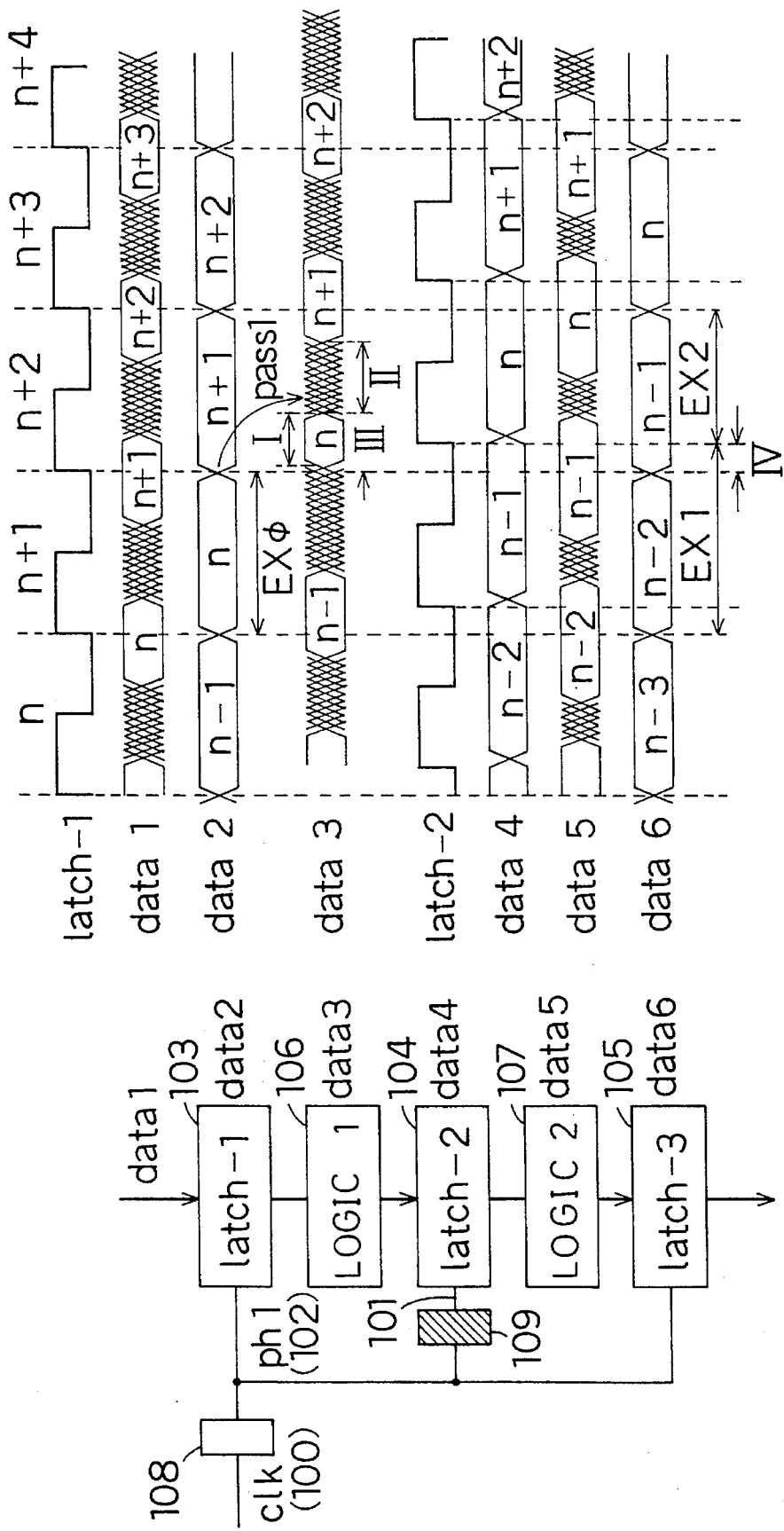
FIG. 3a is a block diagram of an IC of a first example of the present invention.
FIG. 3b is a data flow diagram of an IC of the first example.

FIG. 3a is a block diagram of an IC, contained within the functional block C, for the execution of EXECUTE INSTRUCTION cycle. FIG. 3b is a relevant data flow diagram.

In FIG. 3a, a clock generator 108 receives from the clock line 2 of FIG. 1 a clock signal serving as a basic clock 100 and sends out a clock signal ph1 (102) having a constant duty ratio.

A delay element 109 is a timing adjustment means which receives from the clock generator 108 the clock signal ph1 and sends out a clock output 101 that is delayed by a delay time of IV with respect to the clock signal ph1. This delay element 109 is formed by a first buffer 110, a second buffer 111, a resistor R (112) inserted between the first and second buffers 110 and 111, and a capacitor C (113) one of whose terminals is connected between the resistor R (112) and the second buffer 111 (see FIG. 4).

FIG. 3a shows the following: a first latch 103 (latch-1) which, in synchronism with the clock signal ph1, takes data (i.e. data1) and outputs data (i.e. data2); a second latch 104 (latch-2) which, in synchronism with the clock output 101 from the delay element 109, takes data (i.e. data3) and outputs data (i.e. data4); and a third latch 105 (latch-3) which, in synchronism with the clock signal ph1, takes data (i.e. data5) and outputs data (i.e. data6).

Figure 11:
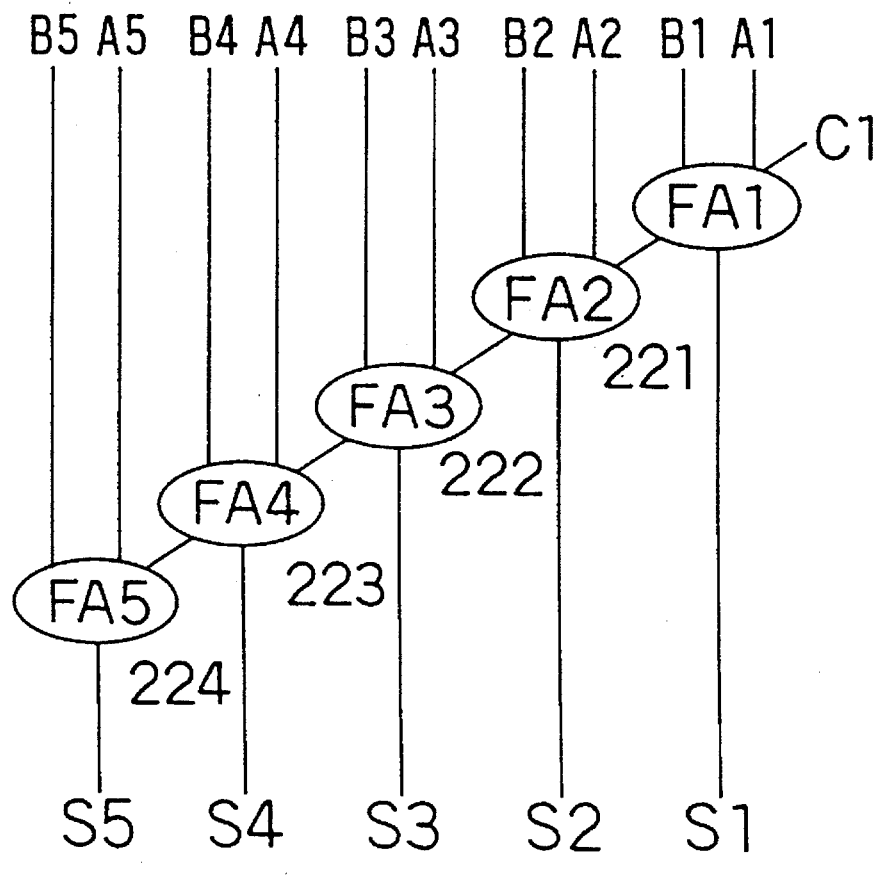
FIG. 11 is a circuit diagram of a logic element of a conventional IC.

FIG. 3a further shows the following: a first logic element 106 which receives data2, processes it, and outputs data3 as a result of such processing; and a second logic element 107 which receives data4, processes it, and outputs data5 as a result of such processing. The first and second logic elements 106 and 107 have different processing times, that is, the processing time of the first logic element 106 is long as compared to the second logic element 106. The First logic element 106 is identical in configuration with the one as shown in FIG. 11.

The operation of the above-described IC is explained by reference to FIGS. 3a and 3b.

The flow of data is explained by taking, for example, n-th data of data1. After having passed through the latch-1, at (n+1)-th cycle, the n-th data is fed into the first logic element 106 as data2 and is defined at the beginning of (n+2)-th cycle. In FIG. 3b, an interval taken for defining the data output of the first logic element 106 is indicated by I. An interval, within which the data output of the first logic element 106 is not subjected to any definition, is indicated by II. The interval I has a sub-interval indicated by III which still remains definite even after (n+1)-th data is applied to an input of the first logic element 106. In other words, the interval III is the minimum delay time of the first logic element 106.

The timing of latching data3 by the latch-2 is delayed by an amount of time IV shorter than the interval III. The n-th data defined at (n+1)-th cycle is latched and is output as data4. The n-th data, which has been output as data4 with a delay of IV at (n+2)-th cycle, is applied to the second logic element 107. At the end of (n+2)-th cycle, the n-th data is output as data5 and is latched by the latch-3. Then, at (n+3)-th cycle, the n-th data is output as data6.

In accordance with the present example, the latch timing of the latch-2, which is a pipeline latch and is located on the second logic element 107 whose processing time is short compared to the first logic element 106, is delayed by the delay time IV, thereby allowing the first logic element 106 to have an execution time of EX1 that is longer by IV than its usual execution time of EX0.

Figure 5:
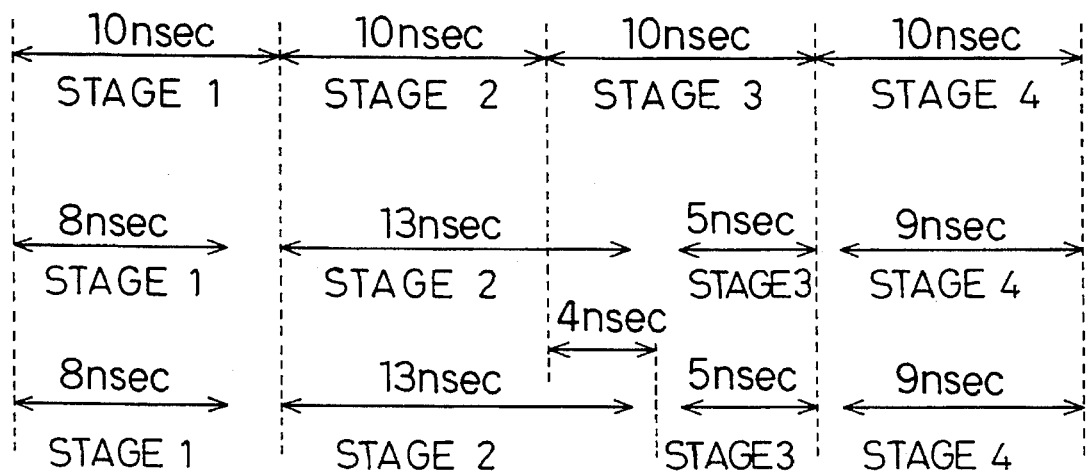
FIG. 5 shows timing adjustment by a timing adjustment means.

FIG. 5 shows how the delay element 109 sets the delay time IV used to delay the clock signal ph1. FIG. 5 shows 4-stage pipeline processing. For example, suppose a processing time of 8-nanoseconds is taken for stage 1, a processing time of 13-nanoseconds is taken for stage 2, a processing time of 5-nanoseconds is taken for stage 8, and a processing time of 9-nanoseconds is taken for stage 4, and the delay time IV is set at 4 nanoseconds. In such a case, conventionally, the maximum of these processing times (i.e. the 13-nanosecond processing time) must be used as a stage clock cycle. Conversely, in accordance with the present example, it is possible to reduce a stage clock cycle down to 10 nanoseconds. In spite of the breaking-in of 3 nanoseconds of stage 2 into the clock cycle of stage 3, there exists an allowance of 1 nanosecond at stage 3.

Further, in accordance with this example, by making the delay time IV shorter than the minimum delay time III of the first logic element 106, it is possible to prevent data jump from occurring at a later stage, as shown by pass1 of FIG. 3b.

EXAMPLE 2

A second example of the invention is described. The second example is identical in configuration with the first example except for a first logic element. In the first example, it is not possible to increase the value of delay of the delay element 109 because the process of rewriting existing output data by the next data is carried out after the interval III of FIG. 3b. Conversely, in the present example, such a value can be increased.

Figure 6A:
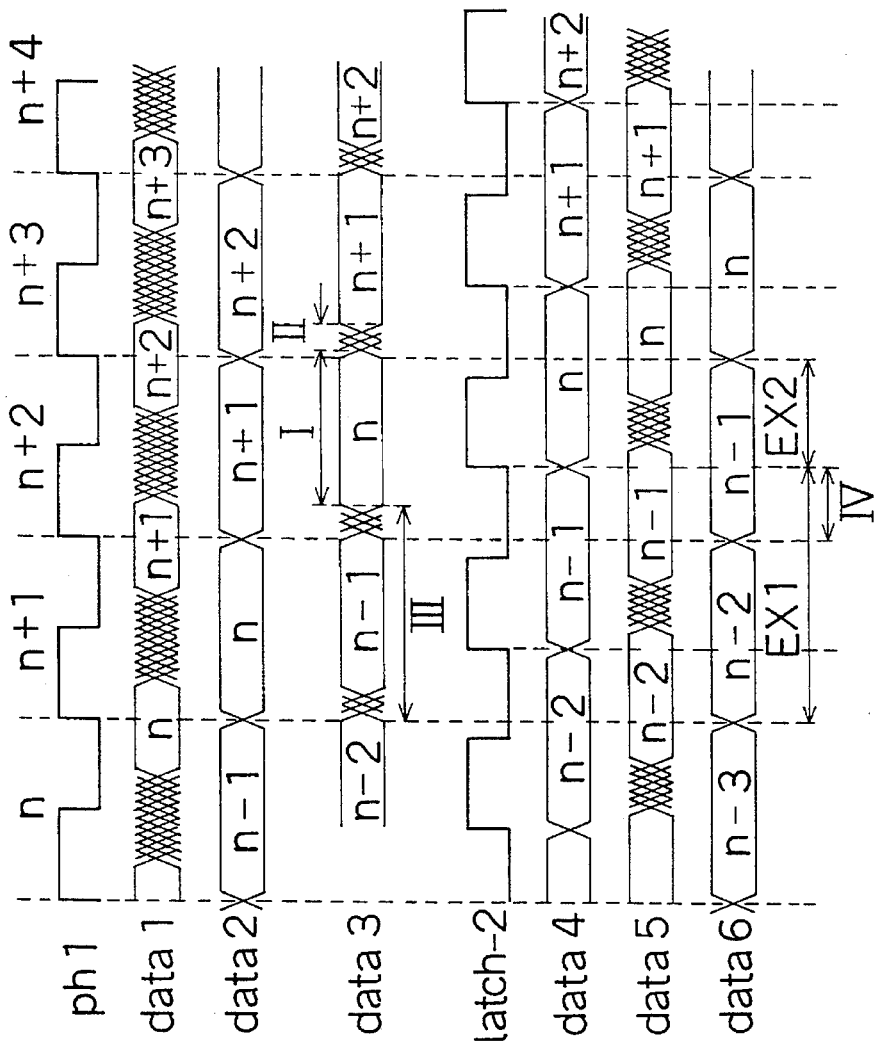
FIG. 6a is a block diagram of a logic element of an IC of a second example of the present invention.
Figure 6B:
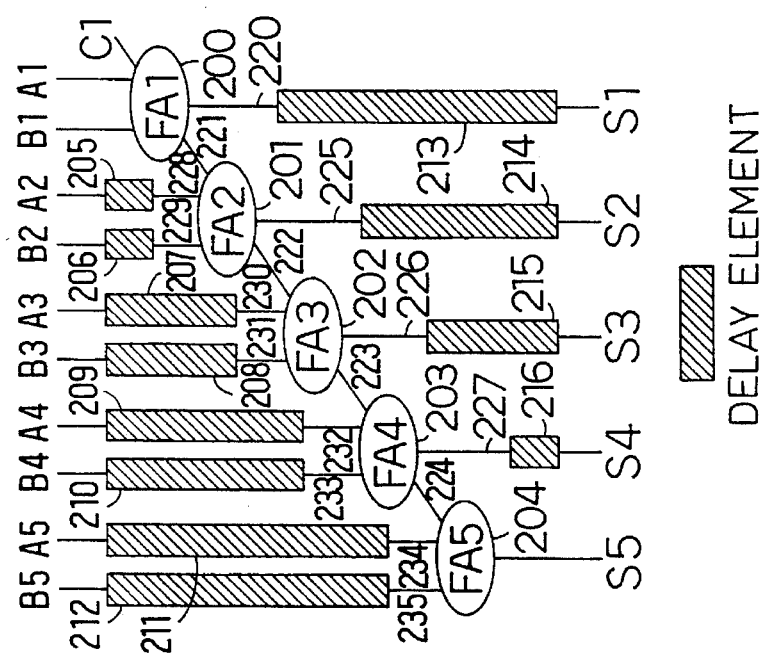
FIG. 6b is a data flow diagram of an IC of the second example.
Figure 8:
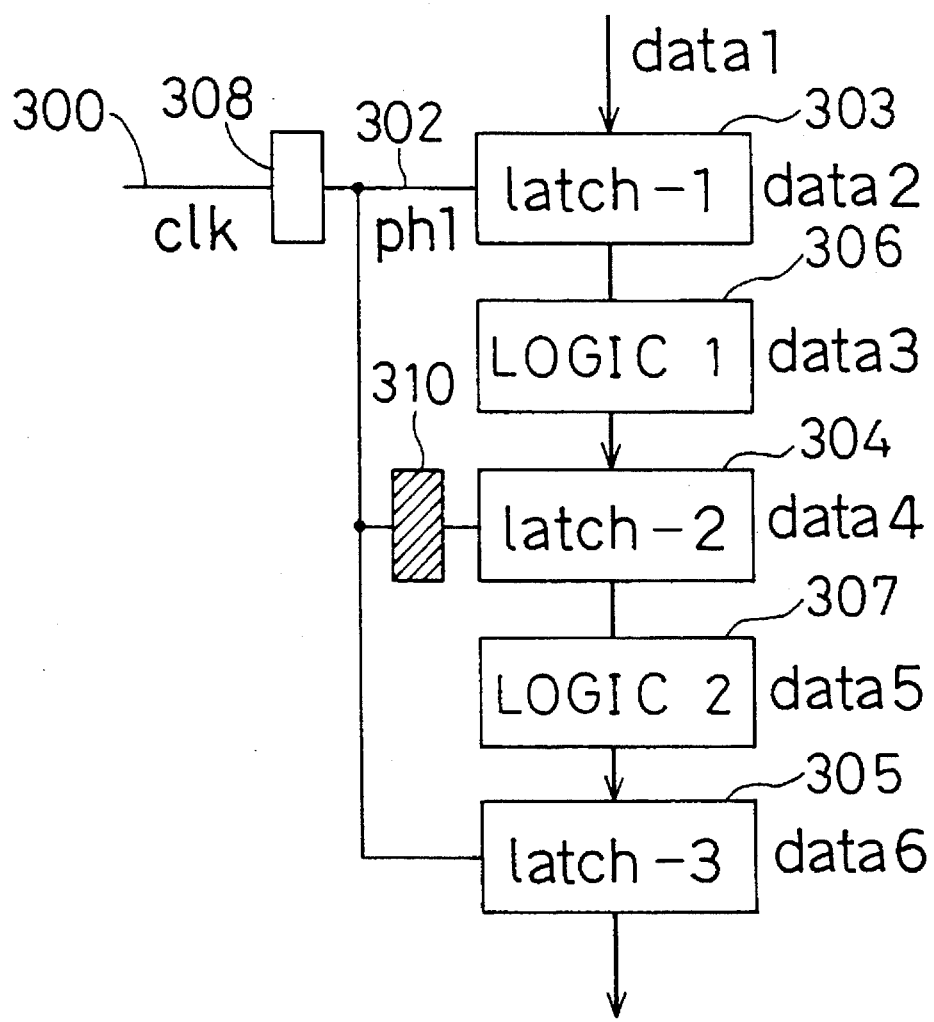
FIG. 8 is a block diagram of a modification of the third example.
Figure 10B:
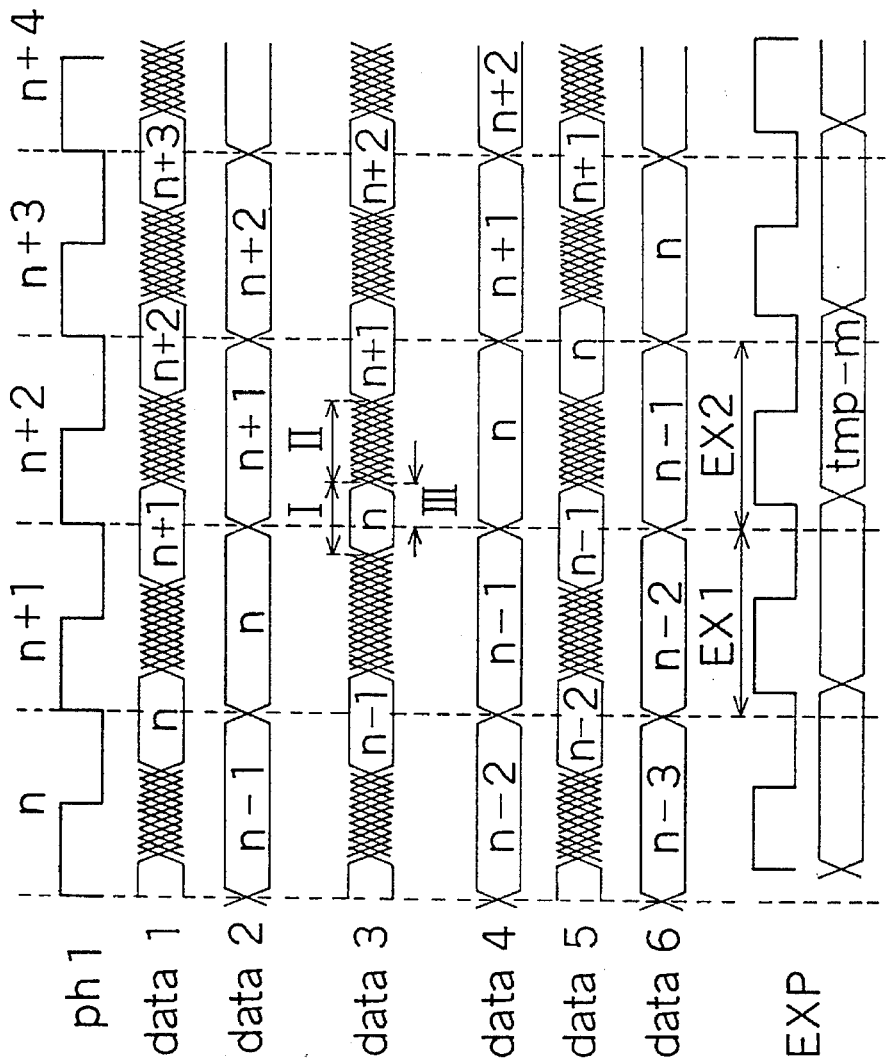
FIG. 10b is a data flow diagram of a conventional IC.
Figure 10A:
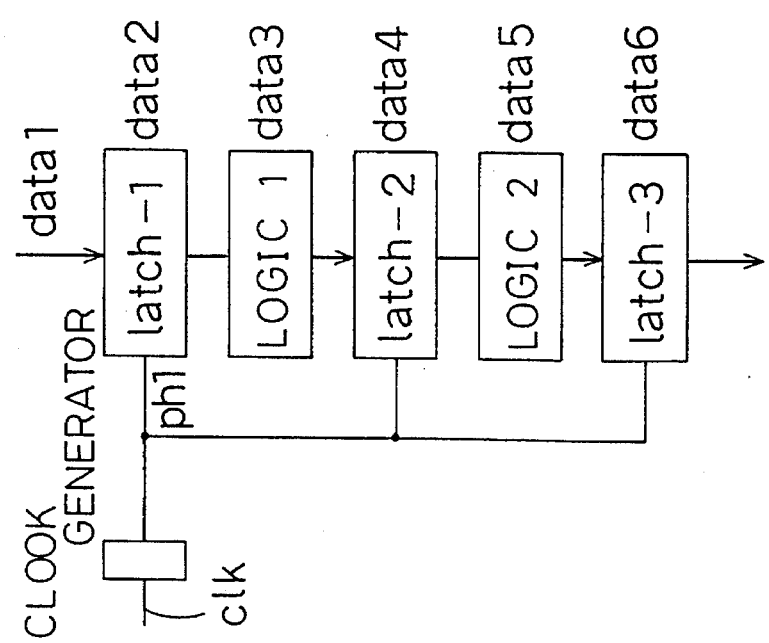
FIG. 10a is a block diagram of a conventional IC.

FIG. 6a is an improved first logic element 106 of the present example. FIG. 6b is a relevant data flow diagram. A1 to A5, B1 to B5, and C1 are equivalent to data2 of FIG. 3. S1 to S5 are equivalent to data3 of FIG. 3. Full adders FA1 to FA5 are provided. 205 is a delay element which receives A2, delays it a given time, and sends out a delay signal 228 of A2. 206 is a delay element which receives B2, delays it a given time, and sends out a delay signal 229 of B2. 214 is a delay element which delays a signal 225 a given time and sends out S2 (i.e. a delay signal) of the signal 225. 213, 207 to 212, and 215 to 216 are delay elements each of which receives a signal, delays it a given time, and sends out a delay signal of the original signal. As clearly seen from FIG. 6a, these delay elements 205 to 216 are not arranged along a carry propagation path which passes through all the full adders FA1 to FA5 thereby taking the maximum delay time but are arranged along another path for A2, B2 to A5 and S1 to S4.

Additionally, it is preferable that the delay times of the delay elements 205 to 216 are set in a preferable way. More specifically, in order to reduce the difference between a delay time between the application of input data to each full adder and the appearance of output data from each full adder and a maximum delay time between the application of A1 to the first full adder FA1 and the appearance of S5 from the last full adder FA5, the delay time of each delay element is preferably set at an optimum value corresponding to such a maximum delay time.

In the first example, there is provided only one data definition interval, i.e. the interval I of FIG. 3b. In the logic element 106 shown in FIG. 6a, however, delay elements (for example, the delay elements 205 and 214) are arranged within a path to which input data is applied and from which, via one full adder, data is output. It is therefore possible to extend, for example, the interval I of FIG. 6b by optimizing the value of the delay elements 206 to 216. Conversely, the interval II can be shortened.

Although, in the first example, it is not possible to delay the latch-2's clock a period longer than the minimum delay time of the first logic element 106, such a minimum delay time can be extendible by the use of a logic element in accordance with the present example. Further, it is possible to delay the latch-2's clock for a longer period compared to the first example. Furthermore, if the value of the delay elements 205 to 216 is determined in such a way that the delay time of paths respectively passing through delay elements is shorter than the maximum delay time of the logic element, this prevents the maximum delay time of the first logic element 106 from increasing.

In accordance with the present invention, the minimum delay time can be extendible by the use of a logic element as shown in FIG. 6a and the latch-2's clock can be delayed for a longer time compared to the first example. This results in the reduction in clock cycle even for pipeline processing involving a logic element whose processing time is long.

EXAMPLE 3

A third example of the invention is now described.

FIG. 7a is a block diagram of an IC of this example. FIG. 7b is a relevant data flow diagram. This IC comprises the following:

a clock generator 808 which receives a basic clock 800 and outputs, with a given delay, a clock signal having a constant duty ratio based on the basic clock 800, and thus which serves as a timing adjustment means;

a delay element 809 which delays a clock signal from the clock generator 808 a given time and outputs a clock signal ph1 (802) and thus which is used to provide an adequate delay between the clock signal ph1 (302) and the basic clock 300;

a latch-1 (303) which, in synchronism with the clock signal ph1, takes data1 and outputs data2;

a latch-2 (304) which, in synchronism with the basic clock 300, takes data3 and outputs data4;

a latch-3 (305) which, in synchronism with the clock signal ph1, takes data5 and outputs data6;

a first logic element 306 which receives data2, processes it, and outputs data3; and a second logic element 307 which receives data4, processes it, and outputs data5.

The first and second logic elements 306 and 307 have different processing times, that is, the former has a shorter processing time than the latter.

Referring still to FIGS. 7a and 7b, the operation of the present example is explained.

N-th data of data1 is used to describe the flow of data. After having passed through the latch-1, at (n+1)-th cycle, the n-th data is fed into the first logic element 306 as data2 and is defined at the middle of (n+1)-th cycle. In FIG. 7b, an interval taken for defining the data output of the second logic element 307 is indicated by I. An interval, within which the data output of the second logic element 307 is not subjected to any definition, is indicated by II. An interval III is the minimum delay time of the first logic element 306.

The latch-2 latches the n-th data, in synchronism with the basic clock 300. The n-th data is fed to the second logic element 307 an interval of III (i.e. the sum of the delay time of the clock generator 308 and the delay time of the delay element 309) ahead of (n+2)-th cycle. Then, the n-th data is defined at the end of (n+2)-th cycle. The n-th data is then latched by the latch-3, and at (n+3)-th cycle the n-th data is output.

In accordance with the present example, the latch timing of the latch-1 arranged on the first logic element 306 whose processing time is short is delayed by the use of the clock generator 308 and delay element 309. In other words, the latch timing of the latch-2 arranged on the second logic element 307 whose processing time is long is advanced by the basic clock 300. This allows the first logic element 306 to have an execution time of EX1 which is shorter by III than its usual execution time of EX0, while, on the other hand, allowing the second logic element 307 to have an execution time of EX2 that is longer by III than its usual execution time of EX0. Accordingly, pipeline execution time becomes variable.

Where internal delay of the clock generator 308 is longer than the minimum delay time of the second logic element 307 whose processing time is long, it is possible to prevent data jump from data4 to data6 from occurring. More specifically, the provision of the delay element 309 of FIG. 7a is omitted and a delay element 310 is arranged upstream of the latch-2 in order to delay the basic clock 300. The latch-2 is forced to operate in synchronism with a clock signal delivered from the delay element 310 so as to make the difference in latch timing between the latch-1 and the latch-2 shorter than the minimum delay time of the second logic element 307 whose processing time is long.

EXAMPLE 4

A fourth example of the invention is now described which is identical in configuration with the third example except for a second logic element 307. In the third example, the process of rewriting existing output data by the next data is carried out after an interval indicated by pass2 of FIG. 7a. As a result, if the total of the delay time of the clock generator 308 and the delay time of the delay element 309 is longer than the minimum delay time of the second logic element 307, data jump is likely to occur. The present example offers a solution to such a problem by employing a configuration similar to that of the second example, FIG. 9a is the organization of the second logic element 307 shown in FIG. 7a. FIG. 9b is a relevant data flow diagram. Basically, a logic element as shown in FIG. 9a is identical in configuration with the one of FIG. 11. Therefore, with regard to the same elements as in FIG. 11, the same reference numerals are used.

A delay element 405 receives A2 and sends out a delay signal 428 of A2. A delay element 406 receives B2 and sends out a delay signal 429 of B2. A delay element 414 receives a signal 425 and sends out S2 (i.e. a delay signal) of the signal 425. Likewise, delay elements 413, 407 to 412, and 415 to 416 each receive an input signal and output a delay signal of the original input signal. It is preferable that the delay times of the delay elements 205 to 216 are set in a preferable way. More specifically, in order to reduce the difference between a delay time between the application of input data to each full adder and the appearance of output data from each full adder and a maximum delay time between the application of A1 to the first full adder FA1 and the appearance of S5 from the last full adder FA5, the delay time of each delay element is preferably set at an optimum value corresponding to such a maximum delay time.

Therefore, for the case of a logic element as shown in FIG. 9a, the values of the delay elements 405 to 416 are optimized. This results in increasing a data definition interval, like the interval I of FIG. 9a, although in the third example there is provided only one data definition interval, i.e. the interval I of FIG. 7b. Conversely, the interval II can be shortened. In the third example, it is not possible to advance the latch-2's clock more than the minimum delay time of the second logic element 307. However, by using a logic element in accordance with the present example, it is possible to prolong the minimum delay time thereby advancing the latch-2's clock more than the third example.

Since the delay time of paths respectively passing through the delay elements 405 to 416 are determined in such a way as to be below a logic element's maximum delay time, the maximum delay time of the second logic element 807 does not become increased due to the value of each delay element.

Because of employing a logic element of FIG. 9a, it is feasible to increase the minimum delay time of the second logic element, whereby the latch-2's clock can be advanced more than the third example, the effect of which is that the variable of pipeline cycle can be increased.

In the aforesaid first to fourth examples, pipeline processing at execution cycle is described. This, however, is not to be considered restrictive. The present invention is applicable to other types of cycles in which pipeline processing involves a plurality of stages. Further, the clock of the latch-1, latch-2, and latch-8 is directly driven in the examples, but it is possible to insert a driver or logic gate between the latches.

Further, in the examples, the logic element is a full adder. Instead of using a full adder, a subtracter, multiplier, divider, or square root device may be used.

Figure 4:
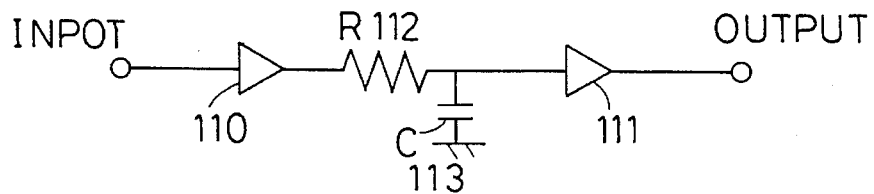
FIG. 4 is a diagram showing in detail a delay element of the first example.

Further, in the examples, a delay circuit incorporating a buffer of FIG. 4 is used as a delay element. Other types may be used.

Furthermore, in the examples, 2-stage pipeline processing is explained. However, the present invention is applicable to any two stages of three or more stage pipeline processing.

The invention claimed is:

1. An integrated circuit comprising:
   a timing adjustment means which receives a clock signal and changes an output timing of said received clock signal to produce an adjusted clock signal, a time cycle of which is identical with that of said received clock signal;
   a first latch which receives, as a first input clock signal, either said received clock signal or said adjusted clock signal, said first latch for latching data in synchronization with said first input clock signal and for transmitting output data which was latched in said first latch in a time interval of said first input clock signal;
   a first logic element which receives said output data from said first latch, starts a first process with respect to said output data from said first latch, and outputs a processed result upon completion of said first process;
   a second latch which receives, as a second input clock signal, either said received clock signal or said adjusted clock signal, whichever of said clock signals is not input to said first latch, said second latch for latching an output of said first logic element in synchronization with said second input clock signal, said second latch further transmitting output data which was latched in a time interval of said second input clock signal;
   a second logic element which receives said output data from said second latch, starts a second process with respect to the output data from said second latch, and outputs a processed result upon completion of said second process,
   wherein either said first or said second logic element has a shorter processing time than the time cycle of said received clock signal and said adjusted clock signal, while the other logic element has a longer processing time than the time cycle of said received clock signal and said adjusted clock signal,
   whereby either said first or said second logic element, whichever has said shorter processing time, is completed during the time cycle of either said received or said adjusted clock signal, and said first or said second logic element, whichever has said longer processing time, is completed in a time cycle comprising a period of time remaining in the time cycle of either said received or said adjusted clock signal, after completion of said shorter processing time, in addition to the time cycle of the other clock signal.

2. The integrated circuit as in claim 1, wherein said timing adjustment means functions in a way that a clock signal being applied to one of said first and second latches that gives its output to one of said first and second logic elements that has a shorter processing time than the other is delayed by an amount of time shorter than the minimum delay time of one of said first and second logic elements that has a longer processing time than the other, and that a clock signal being applied to another latch which gives its output to one of said first and second logic elements that has a longer processing time than the other is not delayed.

3. The integrated circuit as in claim 2, wherein:
   said second logic element has a shorter processing time than said first logic element; and
   said timing adjustment means delivers a clock signal with a delay to said second latch and a clock signal without a delay to said first latch.

4. The integrated circuit as in claim 2, wherein:
   said first logic element has a shorter processing time than said second logic element; and
   said timing adjustment means delivers a clock signal with a delay to said first latch and a clock signal without a delay to said second latch.

5. An integrated circuit comprising:
   a timing adjustment means which receives an external clock signal and produces a delayed clock signal, a time cycle of which is identical with that of said external clock signal;
   a first latch which receives said external clock signal, said first latch for latching data in synchronization with said external clock signal and for transmitting output data which was latched in said first latch in a time interval of said external clock signal;
   a first logic element which receives said output data from said first latch, starts a first process with respect to said output data from said first latch, concurrently with said first latch receiving said external clock signal, and outputs a processed result upon completion of said first process;
   a second latch which receives said delayed clock signal, said second latch for latching an output of said first logic element in synchronization with said delayed clock signal, said second latch further transmitting output data which was latched in a time interval of said delayed clock signal;
   a second logic element which receives said output data from said second latch, starts a second process with respect to the output data from said second latch, concurrently with said second latch receiving said delayed clock signal, and outputs a processed result upon completion of said second process, and said second logic element having a shorter processing time than that of said first logic element;
   wherein said second logic element has a shorter processing time than the time cycle of said delayed clock signal, while said first logic element has a longer processing time than the time cycle of said external clock signal,
   whereby the second process in said second logic element is completed during the time cycle of said delayed clock signal, and the first process in said first logic element is completed in a time cycle comprising a period of time remaining in the time cycle of said delayed clock signal, after completion of said second process, in addition to the time cycle of the external clock signal.

6. An integrated circuit comprising:

a timing adjustment means which receives an external clock signal and produces a delayed clock signal, a time cycle of which is identical with that of said external clock signal;

a first latch which receives said delayed clock signal, said first latch for latching data in synchronization with said delayed clock signal and for transmitting output data which was latched in said first latch in a time interval of said delayed clock signal;

a first logic element which receives said output data from said first latch, starts a first process with respect to said output data from said first latch, concurrently with said first latch receiving said delayed clock signal, and outputs a processed result upon completion of said first process;

a second latch which receives said external clock signal, said second latch for latching an output of said first logic element in synchronization with said external clock signal, said second latch further transmitting output data which was latched in a time interval of said external clock signal;

a second logic element which receives said output data from said second latch, starts a second process with respect to the output data from said second latch, concurrently with said second latch receiving said external clock signal, and outputs a processed result upon completion of said second process, and said second logic element having a longer processing time than that of said first logic element;

wherein said first logic element has a shorter processing time than the time cycle of said delayed clock signal, while said second logic element has a longer processing time than the time cycle of said external clock signal, whereby the first process in said first logic element is completed during the time cycle of said delayed clock signal, and the second process in said second logic element is completed in a time cycle comprising a period of time remaining in the time cycle of said delayed clock signal, after completion of said first process, in addition to the time cycle of the external clock signal.

7. The integrated circuit as in any of claims 1–6, wherein:

one of said first and second logic elements having a longer processing time than the other has a delay element which is arranged at a path other than a path requiring a maximum delay time for signal propagation; and wherein said timing adjustment means determines a delay time of said delay element to approximate a delay time of said path which said delay element is arranged to a maximum delay time of said logic element having the longer processing time.

8. The integrated circuit as in any of claims 1–6, wherein said integrated circuit is used at the execution cycle of pipeline processing.

9. The integrated circuit as in any of claims 1 to 6, wherein one logic element whose processing time is longer than the other has a carry propagation path.

10. The integrated circuit as in claim 2, wherein said timing adjustment means is formed by a delay means.

11. The integrated circuit as in either claim 4 or 6, wherein said timing adjustment means is formed by a clock generator for generating clock signals.

12. The integrated circuit as in claim 11, wherein said clock generator takes a delay time for generating a clock signal and includes a delay element which, if such a delay time is longer than the maximum delay time of one of said first and second logic elements that has a longer processing time than the other, delays a clock signal that is not delayed by said timing adjustment means.

13. The integrated circuit as in claim 10, wherein said delay element has a buffer and a resistor.

14. The integrated circuit as in claim 7, wherein said integrated circuit is used at the execution cycle of pipeline processing.

15. The integrated circuit as in claim 7, wherein one logic element whose processing time is longer than the other has a carry propagation path.

\* \* \* \* \*